United States Patent [19]

MacDonald

[11] Patent Number: 5,083,851
[45] Date of Patent: Jan. 28, 1992

[54] FULL RESOLUTION STEREOSCOPIC DISPLAY

[75] Inventor: Peter D. MacDonald, Burnaby, Canada

[73] Assignee: MacDonald Dettwiler and Associates Ltd., Richmond, Canada

[21] Appl. No.: 411,870

[22] Filed: Sep. 25, 1989

[30] Foreign Application Priority Data

Sep. 6, 1989 [CA] Canada .................................. 610507

[51] Int. Cl.$^5$ ............................................. G02B 27/22
[52] U.S. Cl. ..................................... 359/462; 359/900
[58] Field of Search ................ 350/130, 320, ; 358/92

[56] References Cited

U.S. PATENT DOCUMENTS

| | | | |
|---|---|---|---|
| 4,429,328 | 1/1984 | Jones, Jr. et al. ...................... | 358/92 |
| 4,528,587 | 7/1985 | Jones, Jr. ................................. | 358/92 |
| 4,562,463 | 12/1985 | Lipton .................................... | 358/92 |

FOREIGN PATENT DOCUMENTS 0099120  5/1986  Japan .................................. 350/130

OTHER PUBLICATIONS

Article entitled "A Flicker-Free Field-Sequential Stereoscopic Video System" by Lenny Lipton and Lhary Meyer, Published Nov. 1984 issue of *SMPTE Journal* ( Copyright 1984 by the Society of Motion Picture and Television Engineers, Inc.).

*Primary Examiner*—Bruce Y. Arnold
*Assistant Examiner*—Rebecca D. Gass
*Attorney, Agent, or Firm*—John R. Uren

[57] ABSTRACT

A stereoscopic full resolution image is displayed on a monitor which is perceived to be substantially flicker free. A left and right eye image of the object are digitally represented. The digitized images are divided into a plurality of horizontal raster lines comprised of a plurality of pixels. The odd and even lines of each image are separated and the result stored in four different locations. The four locations are repeatedly scanned at a 30 Hz rate and the monitor's display is refreshed four times for each scan. The sequential scanning alternates between left and right eye images and odd and even lines which are interleaved on the monitor viewing surface.

9 Claims, 3 Drawing Sheets

FULL RESOLUTION STERESCOPIC DISPLAY

This invention relates to a stereoscopic image display at full monitor resolution and, more particularly, to a stereoscopic image display at full monitor resolution which is perceived to be flicker free.

BACKGROUND OF THE INVENTION

The use of a stereoscopic image display on a monitor is, of course, advantageous since a feeling for the depth of the object being displayed is obtained which enhances the knowledge obtained by the viewer from the image displayed. Such displays, however, have typically been difficult to obtain.

Current digital stereoscopic display systems are based on individual selection devices which direct a different view of the same three dimensional object to the left eye than to the right eye. Using this technique, several commercial systems have been based on a time-multiplex technique in which left and right video images are presented sequentially. Observers view the alternate left and right images through electro-optical or mechanical shuttering devices synchronized to the alternation of left and right video images. These systems have been based upon standard commercial CRT monitors which refresh the screen at 60 Hz, non-interlaced.

A screen refreshed at the standard 60 Hz conventional time multiplexed rate, however, results in a perceived noticeable flicker to the eye of an observer because the number of screen refreshes per second is reduced from 60 to 30 per eye since two images are being viewed. An image that is perceived to be flicker-free is required to be refreshed at a rate of approximately 50 per second.

One attempt to overcome the flicker problem with stereoscopic imaging was to reduce the number of lines making up each of the left and right hand images by a factor of two. The two reduced resolution images were stored sequentially in a frame memory. A controller inserted an extra vertical sync pulse midway between each pair of vertical sync pulses in the sync output of the display controller. The modified sync signal was used to drive the monitor which had its vertical deflect circuitry modified to cover the active area of the screen in 1/120 sec. rather than 1/60 sec. The net effect was to alternate between half resolution right and left images at 120 Hz. Each time the display controller's frame memory was scanned, the screen was refreshed twice, once with the left image and once with the right. Flicker free imaging was, therefore, obtained with commercially available and conventional hardware. The division of a standard NTSC refresh field into two equal subfields results in the display of the left image on the even lines of the monitors viewing surface. The right image is displayed on the odd monitor lines. Since only half the resolution of the monitor is available for the display of each image, this result is less than satisfactory. Reference is made, in this regard, to the article entitled "A Flicker-Free Field-Sequential Stereoscopic Video System" by Lipton and Meyer, *SMPTE Journal*, Nov. 1984.

SUMMARY OF THE INVENTION

It is desirable, however, to use the conventional hardware of the example just described and, according to the invention, it is possible to do so and to obtain a substantially flicker free image without losing the vertical resolution which was a disadvantage of the aforementioned Lipton et al technique.

Assuming the use of a conventional monitor, the data rate from a display controller to the monitor is fixed. If the screen refresh rate per eye is to remain at 60 Hz in order to be flicker free to the observer, it is necessary to display twice as many images per second. Rather than reduce the amount of data per image transferred to the monitor by the controller as in the previous technique, it is proposed to display each eyes image over two field intervals rather than one, the first field interval displaying the even lines and the second field interval displaying the odd lines. If the even and odd lines are interlaced on the screen, the observer will integrate the even and odd lines, for each eye, into a single image displayed at the full resolution of the monitor.

Under the solution previously described, each field consisted of two subfields displayed on interlaced lines of the monitor. Representing the left image by the letter "L" and the right image by the letter "R" and designating the even and odd monitor lines with subscripts "e" and "o", respectively, a sequence of two fields comprises four subfields $L_e, R_o, L_e, R_o$.

It is proposed, to offset the second field of each frame by a single monitor line such that the frame comprises the sequence of $L_e, R_o, L_o, R_e$. The sequence will cause data displayed during the first field interval to be interlaced on the monitor with the data displayed during the second field interval. This makes it possible to display different image lines in the second field interval than in the first field interval, and to thereby recover use of the full resolution of the monitor.

The full left image and the full right image, therefore, are proposed to be stored in a display controller frame memory of sufficient size to hold two full sized images. The image data is stored so that as the data is scanned, the even image lines are displayed on the even monitor lines and the odd image lines are displayed on the odd monitor lines. This sequence corresponds to $L_e, R_o, L_o, R_e$ where the subscripts denote the even and odd image lines. Each time the entire frame is scanned in the frame buffer, the monitor screen will have been refreshed four times, once for each subfield. The observer will view alternate left and right images through a shuttering device synchronized to the alternation of the left and right video images.

The full set of information constituting the frame is repeatedly sent to the monitor at a rate equal to half the field rate and since a frame consists of twice as many pixels as a field, the actual data rate to the monitor remains unchanged. The repeated subfield sequence of $L_e, R_o, L_o, R_e$ is unique and results in the display of a flicker free, full resolution stereoscopic image.

According to one aspect of the invention, there is disclosed a method of displaying a stereoscopic image on a monitor which image is perceived to be substantially flicker free comprising the steps of digitally representing left and right eye images of an object, displaying the even numbered raster lines of said left eye image on the even numbered raster lines of said monitor, interlacing the odd numbered raster lines of said right eye image, displaying the odd numbered raster lines of said left eye image on the odd numbered raster lines of said monitor and interlacing the even numbered raster lines of said right eye image.

According to a further aspect of the invention, there is disclosed a method of displaying a stereoscopic image on a monitor which image is perceived to be substantially flicker free comprising the steps of digitally representing left and right eye images of an object, displaying one of the odd or even numbered raster lines of one of said left or right hand images on one of the odd or even numbered raster lines of said monitor, and interlacing the other of said odd or even numbered raster lines with the other of said left or right hand images on the other of said odd or even numbered raster lines of said monitor.

According to yet a further aspect of the invention, there is disclosed a method of displaying a stereoscopic image on a monitor which image is perceived to be substantially flicker free comprising the steps of digitally representing left and right eye images of an object, displaying the even numbered raster lines of said left eye image on the even numbered lines of the viewing surface of said monitor, displaying the odd numbered lines of said right eye image on the odd numbered lines of said viewing surface, displaying the odd numbered lines of said left eye image on the odd numbered lines of said viewing surface, and displaying the even numbered lines of said right eye image on the even numbered lines of said viewing surface.

According to yet a further aspect of the invention, there is disclosed an apparatus for displaying a stereoscopic image comprising computer means for digitally representing the left and right hand images of an object, memory means for storing said digitally represented left and right hand images, controller means for scanning said left and right hand images and sequentially transmitting the even numbered raster lines of said left eye image and the odd numbered raster lines of said right eye image and monitor means for displaying said image.

BRIEF DESCRIPTION OF THE SEVERAL VIEWS OF THE DRAWINGS

An embodiment of the invention will now be described, by way of example only, with the use of drawings in which.

DESCRIPTION OF SPECIFIC EMBODIMENT

Figure 1:
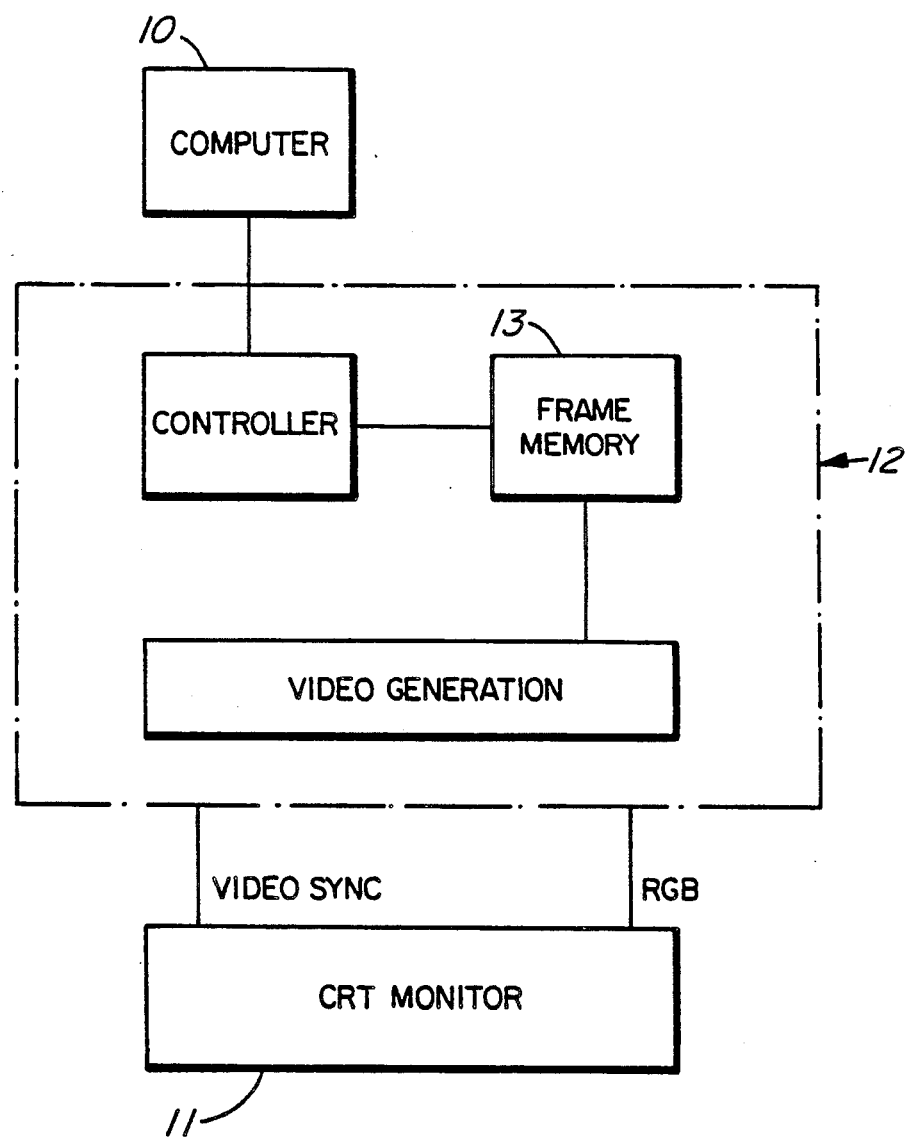
FIG. 1 is a diagrammatic view of a pixel mapped display subsystem.

Referring now to the drawings, a digital computer 10 is attached to a commercially available NTSC standard CRT monitor 11 through a display controller generally illustrated at 12 in FIG. 1.

The display controller 12 includes an internal frame memory 13. The frame memory 13 comprises a memory matrix loaded with data describing the pixels to be displayed which is used to continuously update the screen of the monitor 11. The monitor 11 has a screen resolution of approximately 1000 pixels per row and approximately 1000 rows.

Figure 3:
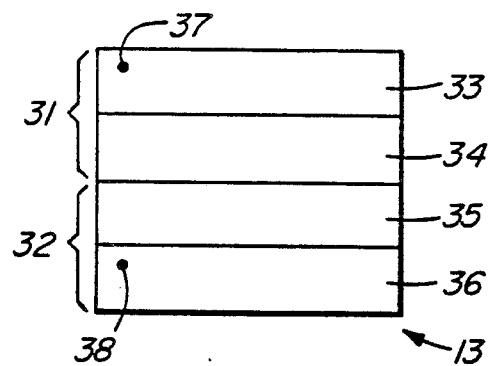
FIG. 3 is a diagrammatic view of the frame memory.

The frame memory 13 of the display controller 12 is large enough to store two full resolution images. The partitioning of the memory 13 holds first and second refresh fields 31, 32 (FIG. 3). Each field 31, 32 has a start address 37, 38, respectively. Field 31 is further subdivided into subfield partitions 33, 34. Similarly, field 32 is subdivided into subfield partitions 35, 36, as illustrated.

Figure 2:
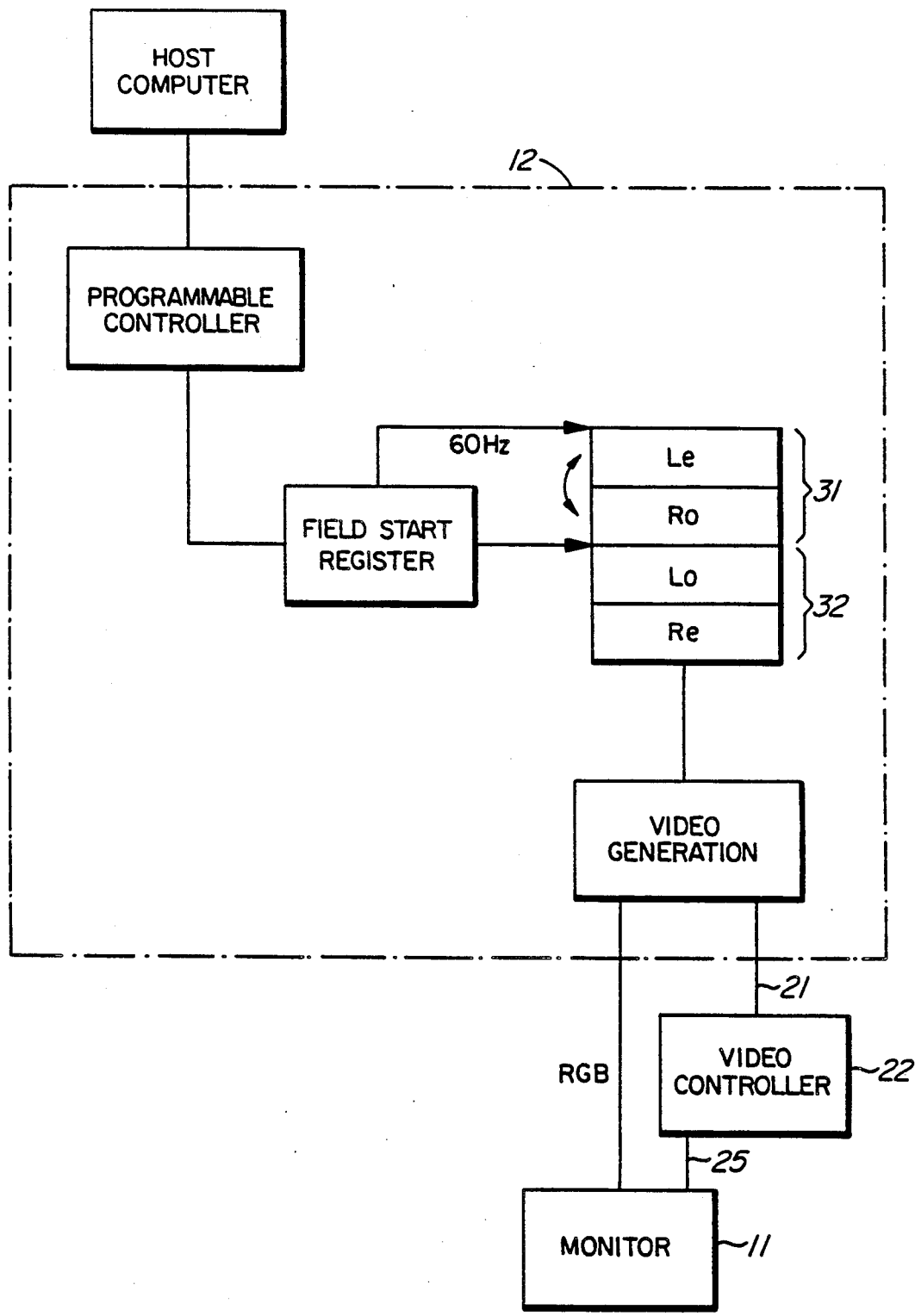
FIG. 2 is a diagrammatic view of the stereoscopic display subsystem according to the invention.

Display controller 12 can be programmed to refresh the screen of the monitor 11 from different areas of its memory 13 by known methods such as altering the value of the pointer indicating the start locations of the respective fields. The display controller 12 can further be programmed to switch between different refresh memory locations in synchronization with its internal 60 Hz sync output signal as at 21 (FIG. 2). A display controller which fills the above conditions is a TAAC-1 from SUN Microsystems.

Image data Le (left image — even lines), Ro (right image — odd lines) is stored in first refresh field 31 (FIG. 2). Image data Lo (left image - odd lines), Re (right image — even lines) is stored in second refresh field 32. As illustrated, the display controller 12 is programmed to switch between displaying field 31 and field 32 in synchronization with the 60 Hz synchronization signal.

A video controller 22 such as one manufactured by Stereographics Corporation is utilised which enables the sync signal 21 of the display controller 12 to be converted from 60 Hz to 120 Hz as at 25. A modification is made to the sync circuitry of video controller 22, the modification offsetting the display of the second field in each frame by one screen line. Such a modification can be made by changing the contents of a Programmable Read Only Memory ("PROM") which controls the sync modification circuitry of the video controller 22. In addition, monitor 11 utilises modified vertical deflection circuitry. Such deflection circuitry ensures that each of the displayed subfields 33, 34, 35, 36 cover the entire active area of the monitor 11.

OPERATION

Referring now to FIG. 1, the conventional display of digital imagery on CRT monitor 11 is initially described.

The image data is stored in the frame memory 13. The lines of pixels are stored sequentially in the memory, ordered from topmost image line to bottommost image line. Within each line, the pixels are stored sequentially, ordered from leftmost pixel to rightmost pixel. The display controller 12 updates the screen of the monitor 11 from information in the frame memory of the display controller 12 by scanning sequential frame memory locations. As the frame memory 13 is scanned, the pixel values are converted to analog red, green, blue, signals and are output to the monitor 20. This results in an output sequence of pixel intensity values consisting of the first row (left to right) of the frame memory followed by the second row and so forth until all of the rows in the frame memory 13 have been scanned.

The display controller 12 also generates the analog sync signal 21 (FIG. 2) which is sent to the monitor 11 to control the contact position of the red/green/blue electron beams on the phosphorescent surface of the screen of monitor 11. Signal 21 is generated so as to move the contact position over the surface of the screen of monitor 11 in raster fashion. The screen is scanned row by row from top to bottom and within each row, from left to right. The effect is to map the output pixels read from the frame memory 13 of the display controller 12 onto the surface of the screen of the monitor 11. Thus, the rectangular image held in the frame memory 13 of the display controller 12 is mapped one to one onto the rectangular face of the screen of the monitor 11.

The CRT monitor 11 positions electron beams for red, green and blue colour components according to the incoming sync signal 25. The intensity of each electron beam is modulated by the associated incoming red, green and blue signals. As the electron beams hit a position on the phosphorescent surface of the monitor 11, the emitted red, green and blue colour components mix to form the colour represented by the associated frame memory pixel. Since each colour emission only persists for a short period of time, the process of mapping frame memory pixels to displayed screen pixels must be continuously repeated. The display controller 12 displays a complete field every 1/60 second.

The modified operation illustrated in FIG. 2 will now be described.

The full left eye image and right eye image are stored in the frame memory 13 of the display controller 12. The even numbered lines of the left eye image ("Le") are stored, followed by the odd numbered lines of the right eye image ("Ro"), followed by the odd numbered lines of the left eye image ("Lo"), followed by the even numbered lines of the right eye image ("Re"). Within each set of odd or even image lines, the lines are ordered from top to bottom. Within each line the pixels are ordered from left to right.

The display controller 12 is then programmed to read pixel data from alternate frame memory field partitions on successive field updates. This is accomplished by detecting the completion of each field, and altering the value of a register indicating the start location in memory of the next field. As a result, the display controller 12 scans through the entire frame memory in 1/30 second. The image pixels are read from memory 13 and are converted to red, green, blue signals in the order in which they are stored in the frame memory 13.

During each 1/30 second frame interval, the display controller generates a sync signal 21 corresponding to two full screen field updates of the monitor 11. The video controller 22 converts this signal into one which controls four half screen updates of the monitor 11. This is accomplished by modification of the incoming sync signal to indicate a return to the field start position at the middle of each normal field. In addition, the sync signal is modified to stretch each half field (subfield) over the entire active area of the screen.

The division of each field 31, 32 into two subfields 34, 35, 36, 37 which extend to cover the entire screen of the monitor 11 results in the first subfield of each field being displayed on the even lines of the monitor 11 and the second subfield of each field being displayed on the odd lines of the monitor. A modification to the sync modification circuitry of the video controller 22 offsets the display of every other field by one screen line. This ensures that corresponding subfields of consecutively displayed fields interlace on the monitor 11. Whereas the first subfield of each frame is displayed on the even monitor lines, the third subfield is displayed on the odd monitor lines. Similarly, the second subfield of each frame is displayed on the odd monitor lines and the fourth subfield of each frame is displayed on the even monitor lines.

Comparing this interlacing scheme with the order in which a frame of image data is obtained from the memory 13, namely, Le,Ro,Lo,Re, it is seen that the even and odd numbered lines for the left eye image are interlaced, as are the even and odd numbered lines for the right eye image.

Figure 4:
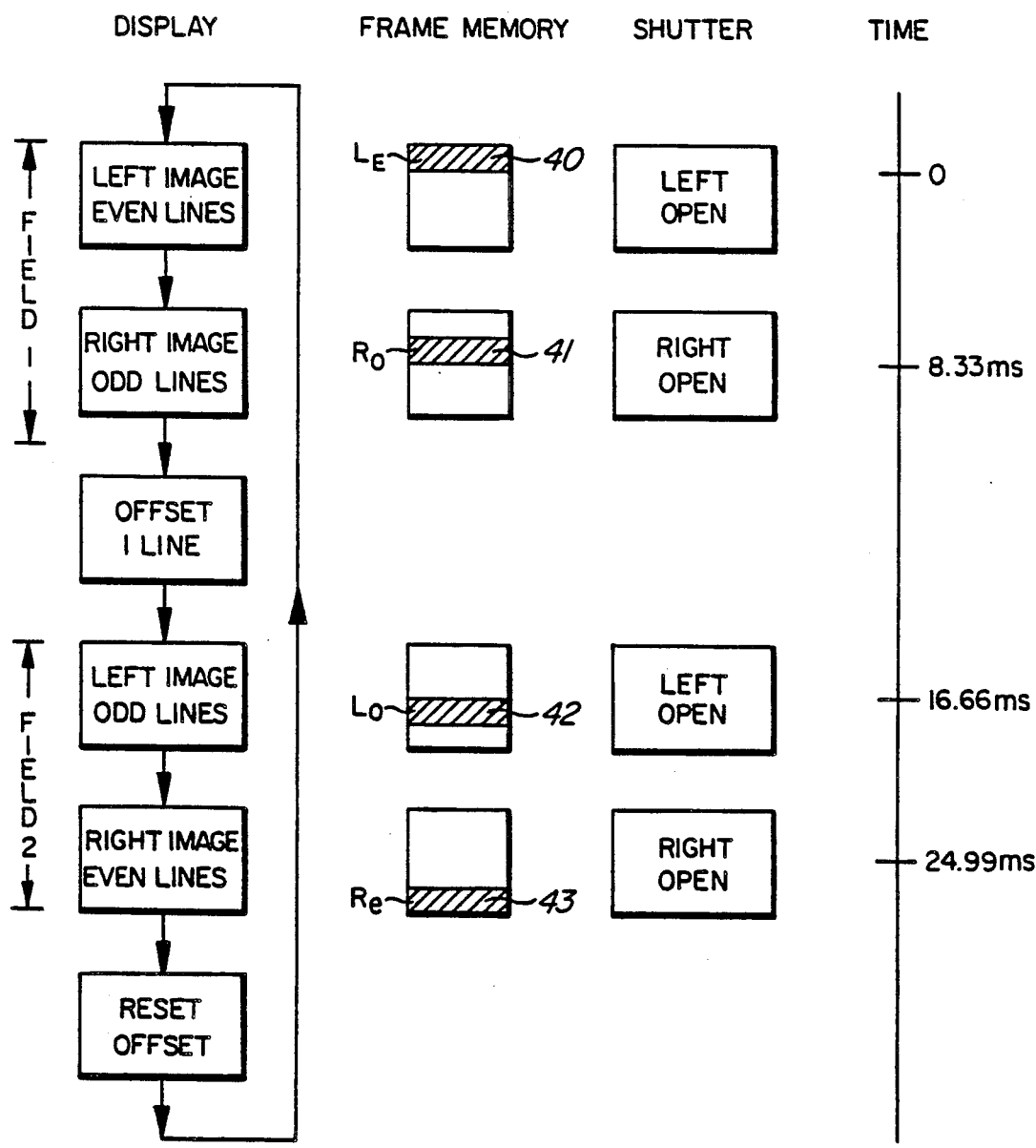
FIG. 4 is a flow chart representing the display, frame memory and shutter sequences.

With reference now to FIG. 4, the pixel data defining the even numbered raster lines of the left image 40 are extracted from a first section of the frame memory 13 by the display controller 12 and transmitted to the monitor 11 beginning at time zero. Approximately 8.3 milliseconds later the pixel data defining the odd numbered raster lines of the right image 41 are extracted from a second section of the frame memory 13 by the controller 12 and transmitted to the monitor 11. Approximately another 8.3 milliseconds later, the raster lines of the monitor 11 are offset by one line such that succeeding pixels are displayed on odd monitor lines of the monitor 11 rather than even monitor lines of the monitor 11 as would normally otherwise be the case. The pixel data defining the odd numbered raster lines of the left image 42 are extracted and displayed in a like manner and 8.3 milliseconds after that the even numbered pixels of the right image 43 are extracted and displayed. The raster line offset is then reset to zero and the process is repeated.

The resulting display is viewed through an electro-optical shutter (not illustrated) synchronized to the subfield alternation of left and right video images as is known in other field-sequential systems and at the time rate illustrated in FIG. 4. The viewers left eye sees an interlaced display of the left eye image at 60 Hz. Thus, the repeated subfield sequence of Le,Ro,Lo,Re results in a substantially flicker free stereoscopic image at full monitor resolution.

It will be noted that the system according to FIG. 2 is a modeless system. That is, it can be used to display monoscopic images as well as stereoscopic images in different areas on the same monitor 11. This is so because each screen pixel has two associated frame buffer pixel values, one for each of the left and right image pixels. If the associated left and right image pixels are equal, the refresh for that area of the screen is simply that of a standard monoscopic display subsystem and the observer will see a single image on the monitor 11. If desired, a simultaneous display of a stereoscopic image on a separate area of the screen may also be obtained.

A software windowing package or window server may be obtained to take advantage of the modelessness. The window server is ported to interface to the stereoscopic display subsystem and is extended to allow for stereoscopic screen windowing where right-eyed and left-eyed images are distinguished. In the case of monoscopic windows, the image to be displayed is automatically loaded by the window server into both the left image and right image areas of the frame buffer. For both stereoscopic and monoscopic windows, even and odd lines are separated as earlier described.

Many modifications may be made by those skilled in the art to which the invention relates and the specific embodiments described should be taken as illustrative of the invention only and not as limiting its scope as defined in accordance with the accompanying claims.

What is claimed is:

1. A method of displaying a stereoscopic image on a monitor which image is perceived to be substantially flicker free comprising the steps of digitally representing left and right eye images of an object, displaying the even numbered raster lines of said left eye image on the even numbered raster lines of said monitor, interlacing the odd numbered raster lines of said right eye image, displaying the odd numbered raster lines of said left eye image on the odd numbered raster lines of said monitor and interlacing the even numbered raster lines of said right eye image.

2. A method as in claim 1 wherein said steps are repeated following said interlacing of said even numbered raster lines of said right eye image.

3. A method as in claim 2 wherein said digitally represented left and right eye images of said object are stored in separate locations in a frame memory.

4. A method as in claim 3 wherein said left and right eye images each comprise a series of even and odd pixel lines, said odd pixel lines of said left eye image being stored at a first location in said frame memory, said even pixel lines of said right eye image being stored at a second location in said frame memory, said even pixel lines of said left eye image being stored at a third location in said frame memory and said odd pixel lines of said right eye image being stored at a fourth location in said frame memory.

5. A method as in claim 4 wherein each of said locations is scanned for data and said data is transferred to said monitor in a sequence identical to said scanning sequence.

6. A method of displaying a stereoscopic image on a monitor which image is perceived to be substantially flicker free comprising the steps of digitally representing left and right eye images of an object, displaying one of the odd or even numbered raster lines of one of said left or right hand images on one of the odd or even numbered raster lines of said monitor, interlacing the other of said odd or even numbered raster lines with the other of said left or right hand images on the other of said odd or even numbered raster lines of said monitor, displaying the other of said odd or even numbered raster lines of the other of said left or right hand images on the other of said odd or even numbered raster lines of said monitor and interlacing the remaining odd or even numbered raster lines of the remaining left or right hand images on the remaining odd or even numbered raster liens of said monitor.

7. A method of displaying a stereoscopic image on a monitor which image is perceived to be substantially flicker free comprising the steps of digitally representing left and right eye images of an object, displaying the even numbered raster lines of said left eye image on the even numbered lines of the viewing surface of said monitor, displaying the odd numbered liens of said right eye image on the odd numbered liens of said viewing surface, displaying the odd numbered lines of said left eye image on the odd numbered lines of said viewing surface, and displaying the even numbered lines of said right eye image on the even numbered lines of said viewing surface.

8. Apparatus for displaying a stereoscopic image comprising computer means for digitally representing the left and right hand images of an object, memory means for storing said digitally represented left and right hand images, controller means for scanning said left and right hand images and sequentially transmitting the even numbered raster lines of said left eye image and the odd numbered raster lines of said right eye image and for sequentially transmitting the odd numbered raster lines of said left eye image and the even numbered raster lines of said right hand image and monitor means for displaying the image resulting from said sequential transmissions.

9. Apparatus for displaying a stereoscopic image comprising computer means for digitally representing the left and right hand images of an object, memory means for storing said digitally represented left and right hand images, controller means for scanning said left and right hand images and sequentially transmitting the even numbered raster lines of said left eye image and the odd numbered raster lines of said right eye image, monitor means for displaying the image resulting from said sequential transmission and offset means for creating an offset of one raster line following the transmission of said odd numbered lines of said right eye image.

* * * * *

UNITED STATES PATENT AND TRADEMARK OFFICE
CERTIFICATE OF CORRECTION

PATENT NO. : 5,083,851

DATED : January 28, 1992

INVENTOR(S) : MacDonald, Peter D.

It is certified that error appears in the above-identified patent and that said Letters Patent is hereby corrected as shown below:

On the title page:

In the Title Identification [54], and Col. 1, line 2, change "FULL RESOLUTION STERESCOPIC DISPLAY" to --FULL RESOLUTION STEREOSCOPIC DISPLAY--.

Column 7, line 39; change "liens" to --lines--
Column 8, line 7; change "liens" to --lines--
Column 8, line 8; change "liens" to --lines--

Signed and Sealed this

Eighth Day of June, 1993

Attest:

MICHAEL K. KIRK

*Attesting Officer*     *Acting Commissioner of Patents and Trademarks*